US012020137B2

(12) United States Patent
Gu et al.

(10) Patent No.: US 12,020,137 B2
(45) Date of Patent: Jun. 25, 2024

(54) SYSTEM, METHOD, AND COMPUTER PROGRAM PRODUCT FOR EVOLUTIONARY LEARNING IN VERIFICATION TEMPLATE MATCHING DURING BIOMETRIC AUTHENTICATION

(71) Applicant: Visa International Service Association, San Francisco, CA (US)

(72) Inventors: Shengfei Gu, Austin, TX (US); Peng Wu, Austin, TX (US); Yiwei Cai, Austin, TX (US); Minghua Xu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 795 days.

(21) Appl. No.: 17/118,740

(22) Filed: Dec. 11, 2020

(65) Prior Publication Data

US 2022/0188598 A1    Jun. 16, 2022

(51) Int. Cl.
*G06N 3/045* (2023.01)
*G06F 18/214* (2023.01)
(Continued)

(52) U.S. Cl.
CPC ........... *G06N 3/045* (2023.01); *G06F 18/214* (2023.01); *G06F 21/32* (2013.01); *G06N 3/044* (2023.01); *G06V 40/167* (2022.01)

(58) Field of Classification Search
CPC .......... G06N 3/045; G06N 3/044; G06N 3/08; G06F 18/214; G06F 21/32; G06V 40/167; G06V 10/82
See application file for complete search history.

(56) References Cited

U.S. PATENT DOCUMENTS 10,565,433 B2    2/2020   Wechsler et al.
10,769,428 B2 *  9/2020   Sharma ................ G06V 30/413
(Continued)

FOREIGN PATENT DOCUMENTS

CN    106951867 A    7/2017
KR    101835333 B1   3/2018

OTHER PUBLICATIONS

Keren Convolutional RNN an Enhanced Model for Extracting Features from Sequential Data, arXiv, 2017 (Year: 2017).*
(Continued)

*Primary Examiner* — Aniss Chad
*Assistant Examiner* — Shien Ming Chou
(74) *Attorney, Agent, or Firm* — The Webb Law Firm

(57) ABSTRACT

Provided are systems for authenticating an individual using image feature templates that include at least one processor to train a first machine learning model based on a training dataset of a plurality of images of a user, generate a plurality of image feature templates using the first machine learning model, wherein each image feature template of the plurality of image feature templates is associated with a positive authentication of the identity of the user during a time interval, generate a second machine learning model based on the plurality of image feature templates, generate a predicted image feature template using the second machine learning model, determine whether to authenticate the identity of the user based on an input image of the user, and perform an action based on determining whether to authenticate the identity of the user. Methods and computer program products are also provided.

17 Claims, 11 Drawing Sheets

(51) Int. Cl.
*G06F 21/32* (2013.01)
*G06N 3/044* (2023.01)
*G06V 40/16* (2022.01)

(56) References Cited

U.S. PATENT DOCUMENTS

2020/0082062 A1* 3/2020 Mequanint ............ G06F 21/44
2020/0366671 A1   11/2020 Larson et al.
2021/0329306 A1* 10/2021 Liu ...................... G06V 40/168

OTHER PUBLICATIONS

Antipov, Face Aging with Conditional Generative Adversarial Networks (Year: 2017).*
Amidi et al., "VIP Cheatsheet: Convolutional Neural Networks", CS 230—Deep Learning, Nov. 26, 2018, pp. 1-5, retrieved from https://stanford.edu/~shervine.
"Recurrent Neural Networks", Understanding LSTM Networks, Aug. 27, 2015, pp. 1-8.
Wang et al., "Orthogonal Deep Features Decomposition for Age-Invariant Face Recognition", ECCV 2018, pp. 1-16, retrieved from https://link.springer.com/conference/eccv.
Zeng et al., "Deep Convolutional Neural Network Used in Single Sample per Person Face Recognition", Computational Intelligence and Neuroscience, Article ID 3803627, Aug. 23, 2018, pp. 1-11, vol. 2018, retrieved from https://doi.org/10.1155/2018/3803627.

* cited by examiner

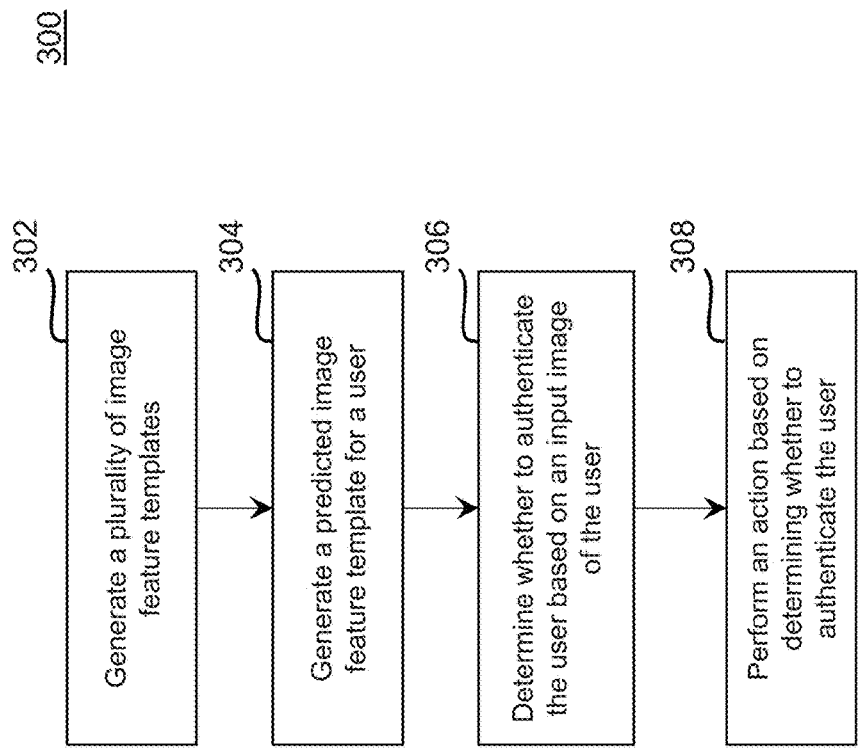

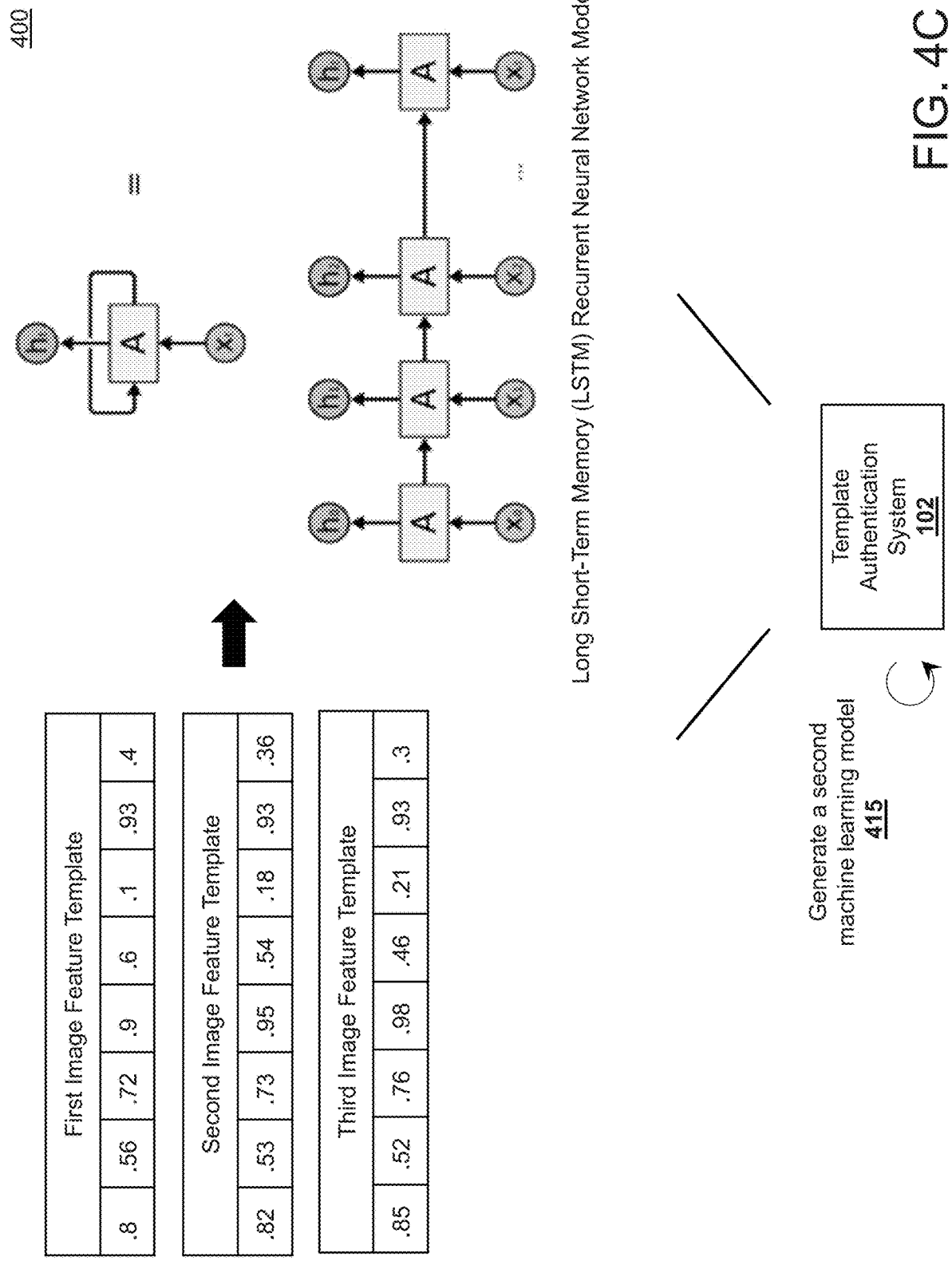

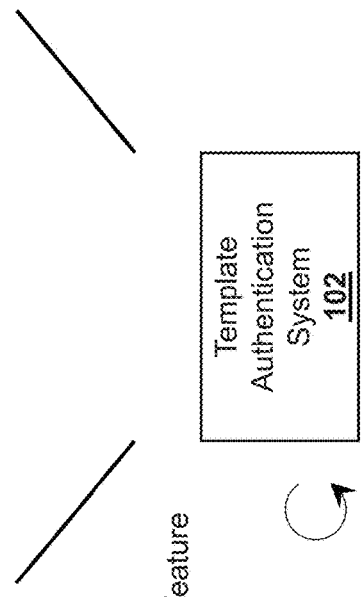
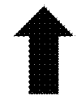
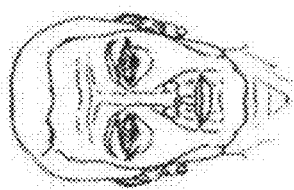
FIG. 4F

SYSTEM, METHOD, AND COMPUTER PROGRAM PRODUCT FOR EVOLUTIONARY LEARNING IN VERIFICATION TEMPLATE MATCHING DURING BIOMETRIC AUTHENTICATION

BACKGROUND

1. Field

This disclosure relates generally to biometric authentication and, in some non-limiting embodiments or aspects, to systems, methods, and computer program products for authenticating an individual using templates developed based on evolutionary learning.

2. Technical Considerations

Authentication refers to a process that is carried out electronically, which involves proving an assertion, such as verifying (e.g., proving) that an asserted identity of an individual is correct. Authentication may be in contrast with identification, which refers to a process of determining and/or indicating an identity of the user. Biometric authentication may refer to the use of unique physical characteristics of an individual, such as a body measurement, as an intermediate for authentication. In some instances, physical characteristics that may be used for authentication include a fingerprint, a voice sample, a facial image, and/or an ocular image (e.g., an iris scan), since these physical characteristics are unique to the individual. In some instances, machine learning may be used with biometric authentication since machine learning makes it possible to drive the process associated with authentication based on the need with biometric authentication to maintain a large number of parameters and data sets that are analyzed.

However, a machine learning model may not be able to account for changes in the physical characteristics of an individual that occurs over time. For example, the machine learning model may not be able authenticate the individual based on a facial image of the individual when aspects of an initial facial image of the individual are different from a later facial image of the individual due to aging. In some instances, numerous samples of the physical characteristics of the individual may be taken over time. However, obtaining and storing the number of samples may require vast amounts of technical resources.

SUMMARY

Accordingly, disclosed are systems, methods, and computer program products for authenticating an individual using feature templates developed based on evolutionary learning.

According to some non-limiting embodiments or aspects, provided is a system, comprising: at least one processor programmed or configured to: train a first machine learning model based on a training dataset of a plurality of images of one or more first users, wherein the first machine learning model is configured to authenticate an identity of the one or more first users based on an input image of the one or more first users; generate a plurality of image feature templates using the first machine learning model, wherein each image feature template of the plurality of image feature templates is associated with a positive authentication of the identity of the one or more first users during a time interval; generate a second machine learning model based on the plurality of image feature templates; generate a predicted image feature template using the second machine learning model; determine to authenticate the identity of a second user based on an input image of the second user, wherein, when determining to authenticate the identity of the second user based on the input image of the second user, the at least one processor is programmed or configured to: generate a current feature template based on the input image of the second user, compare the current feature template to the predicted image feature template, and determine that the current feature template corresponds to the predicted feature template; and perform an action based on determining whether to authenticate the identity of the second user.

According to some non-limiting embodiments or aspects, provided is a method, comprising: training, with at least one processor, a first machine learning model based on a training dataset of a plurality of images of one or more first users, wherein the first machine learning model is configured to authenticate an identity of the one or more first users based on an input image of the one or more first users; generating, with at least one processor, a plurality of image feature templates using the first machine learning model, wherein each image feature template of the plurality of image feature templates is associated with a positive authentication of the identity of the one or more first users during a time interval; generating, with at least one processor, a second machine learning model based on the plurality of image feature templates; generating, with at least one processor, a predicted image feature template using the second machine learning model; determining, with at least one processor, whether to authenticate the identity of a second user based on an input image of the second user, wherein determining whether to authenticate the identity of the second user based on the input image of the second user comprises: generating a current feature template based on the input image of the second user; comparing the current feature template to the predicted image feature template; and determining whether the current feature template corresponds to the predicted feature template; and performing an action based on determining whether to authenticate the identity of the second user.

According to some non-limiting embodiments or aspects, provided is a computer program product, the computer program product comprising at least one non-transitory computer-readable medium including one or more instructions that, when executed by at least one processor, cause the at least one processor to: train a first machine learning model based on a training dataset of a plurality of images of one or more first users, wherein the first machine learning model is configured to authenticate an identity of the one or more first users based on an input image of the one or more first users; generate a plurality of image feature templates using the first machine learning model, wherein each image feature template of the plurality of image feature templates is associated with a positive authentication of the identity of the one or more first users during a time interval; generate a second machine learning model based on the plurality of image feature templates; generate a predicted image feature template using the second machine learning model; determine to authenticate the identity of a second user based on an input image of the second user, wherein, the one or more instructions that cause the at least one processor to determine to authenticate the identity of the second user based on the input image of the second user, cause the at least one processor to: generate a current feature template based on the input image of the second user, compare the current feature template to the predicted image feature template, and determine that the current feature template corresponds to the predicted feature template; and perform an action based on determining whether to authenticate the identity of the second user.

Further non-limiting embodiments or aspects are set forth in the following numbered clauses:

Clause 1: A system, comprising: at least one processor programmed or configured to: train a first machine learning model based on a training dataset of a plurality of images of one or more first users, wherein the first machine learning model is configured to authenticate an identity of the one or more first users based on an input image of the one or more first users; generate a plurality of image feature templates using the first machine learning model, wherein each image feature template of the plurality of image feature templates is associated with a positive authentication of the identity of the one or more first users during a time interval; generate a second machine learning model based on the plurality of image feature templates; generate a predicted image feature template using the second machine learning model; determine to authenticate the identity of a second user based on an input image of the second user, wherein, when determining to authenticate the identity of the second user based on the input image of the second user, the at least one processor is programmed or configured to: generate a current feature template based on the input image of the second user, compare the current feature template to the predicted image feature template, and determine that the current feature template corresponds to the predicted feature template; and perform an action based on determining whether to authenticate the identity of the second user.

Clause 2: The system of clause 1, wherein, when training the first machine learning model based on the training dataset of the plurality of images of the one or more first users, the at least one processor is programmed or configured to: train the first machine learning model based on a training dataset of a plurality of facial images of the one or more first users.

Clause 3: The system of clauses 1 or 2, wherein, when generating the plurality of image feature templates using the first machine learning model, the at least one processor is programmed or configured to: extract a first image feature template from the first machine learning model after training the first machine learning model.

Clause 4: The system of any of clauses 1-3, wherein the at least one processor is programmed or configured to: add the input image of the second user to the plurality of images of the one or more first users in the training dataset to provide an updated training dataset; and retrain the first machine learning model based on the updated training dataset.

Clause 5: The system of any of clauses 1-4, wherein, when generating the plurality of image feature templates using the first machine learning model, the at least one processor is programmed or configured to: extract a first image feature template from the first machine learning model after retraining the first machine learning model based on the updated training dataset.

Clause 6: The system of any of clauses 1-5, wherein the first machine learning model is a convolutional neural network model and the second machine learning model is a long short-term memory recurrent neural network model.

Clause 7: The system of any of clauses 1-6, wherein the predicted image feature template for the second user is associated with a predicted image of the second user after the time interval.

Clause 8: A method, comprising: training, with at least one processor, a first machine learning model based on a training dataset of a plurality of images of one or more first users, wherein the first machine learning model is configured to authenticate an identity of the one or more first users based on an input image of the one or more first users; generating, with at least one processor, a plurality of image feature templates using the first machine learning model, wherein each image feature template of the plurality of image feature templates is associated with a positive authentication of the identity of the one or more first users during a time interval; generating, with at least one processor, a second machine learning model based on the plurality of image feature templates; generating, with at least one processor, a predicted image feature template using the second machine learning model; determining, with at least one processor, whether to authenticate the identity of a second user based on an input image of the second user, wherein determining whether to authenticate the identity of the second user based on the input image of the second user comprises: generating a current feature template based on the input image of the second user; comparing the current feature template to the predicted image feature template; and determining whether the current feature template corresponds to the predicted feature template; and performing an action based on determining whether to authenticate the identity of the second user.

Clause 9: The method of clause 8, wherein training the first machine learning model based on the training dataset of the plurality of images of the one or more first users comprises: training the first machine learning model based on a training dataset of a plurality of facial images of the one or more first users.

Clause 10: The method of clauses 8 or 9, wherein generating the plurality of image feature templates using the first machine learning model comprises: extracting a first image feature template from the first machine learning model after training the first machine learning model.

Clause 11: The method of any of clauses 8-10, further comprising: adding the input image of the second user to the plurality of images of the one or more first users in the training dataset to provide an updated training dataset; and retraining the first machine learning model based on the updated training dataset.

Clause 12: The method of any of clauses 8-11, wherein generating the plurality of image feature templates using the first machine learning model comprises: extracting a first image feature template from the first machine learning model after retraining the first machine learning model.

Clause 13: The method of any of clauses 8-12, wherein the first machine learning model is a convolutional neural network model and the second machine learning model is a long short-term memory recurrent neural network model.

Clause 14: The method of any of clauses 8-13, wherein the predicted image feature template for the second user is associated with a predicted image of the second user after the time interval.

Clause 15: A computer program product, the computer program product comprising at least one non-transitory computer-readable medium including one or more instructions that, when executed by at least one processor, cause the at least one processor to: train a first machine learning model based on a training dataset of a plurality of images of one or more first users, wherein the first machine learning model is configured to authenticate an identity of the one or more first users based on an input image of the one or more first users; generate a plurality of image feature templates using the first machine learning model, wherein each image feature template of the plurality of image feature templates is associated with a positive authentication of the identity of the one or more first users during a time interval; generate a second machine learning model based on the plurality of image feature templates; generate a predicted image feature template using the second machine learning model; determine to authenticate the identity of a second user based on an input image of the second user, wherein, the one or more instructions that cause the at least one processor to determine to authenticate the identity of the second user based on the input image of the second user, cause the at least one processor to: generate a current feature template based on the input image of the second user, compare the current feature template to the predicted image feature template, and determine that the current feature template corresponds to the predicted feature template; and perform an action based on determining whether to authenticate the identity of the second user.

Clause 16: The computer program product of clause 15, wherein, the one or more instructions that cause the at least one processor to train the first machine learning model, cause the at least one processor to: train the first machine learning model based on a training dataset of a plurality of facial images of the one or more first users.

Clause 17: The computer program product of clauses 15 or 16, wherein, the one or more instructions that cause the at least one processor to generate the plurality of image feature templates using the first machine learning model, cause the at least one processor to: extract a first image feature template from the first machine learning model after training the first machine learning model.

Clause 18: The computer program product of any of clauses 15-17, wherein the one or more instructions further cause the at least one processor to: add the input image of the second user to the plurality of images of the one or more first users in the training dataset to provide an updated training dataset; and retrain the first machine learning model based on the updated training dataset.

Clause 19: The computer program product of any of clauses 15-18, wherein, the one or more instructions that cause the at least one processor to generate the plurality of image feature templates using the first machine learning model, cause the at least one processor to: extract a first image feature template from the first machine learning model after retraining the first machine learning model based on the updated training dataset.

Clause 20: The computer program product of any of clauses 15-19, wherein the predicted image feature template for the second user is associated with a predicted image of the second user after the time interval.

Clause 21: The computer program product of any of clauses 15-20, wherein the first machine learning model is a convolutional neural network model and the second machine learning model is a long short-term memory recurrent neural network model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 3 is a flowchart of a non-limiting embodiment or aspect of a process for authenticating an individual using image feature templates; and FIGS. 4A-4H are diagrams of non-limiting embodiments or aspects of an implementation of a process for authenticating an individual using image feature templates.

DESCRIPTION

Figure 1:
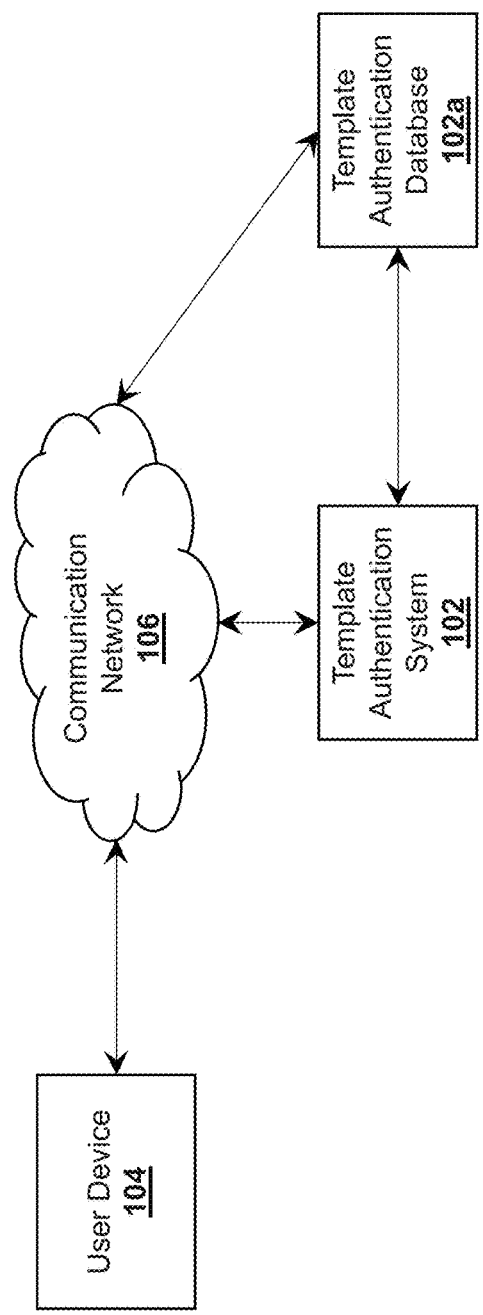
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects or aspects, a POS system (e.g., a merchant POS system) may include one or more server computers programmed or configured to process online payment transactions through webpages, mobile applications, and/or the like.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Some embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Provided are improved systems, methods, and computer program products for authenticating an individual using image feature templates. Embodiments of the present disclosure may include a template authentication system that includes at least one processor programmed or configured to train a first machine learning model (e.g., a feature template authentication machine learning model) based on a training dataset of a plurality of images of one or more first users, where the first machine learning model is configured to authenticate an identity of the one or more first users based on an input image of the one or more first users; generate a plurality of image feature templates using the first machine learning model, where each image feature template of the plurality of image feature templates is associated with a positive authentication of the identity of the one or more first users during the time interval, generate a second machine learning model based on the plurality of image feature templates, generate a predicted image feature template using the second machine learning model, determine to authenticate the identity of a second user based on an input image of the second user, where, when determining to authenticate the identity of the second user based on the input image of the second user, the at least one processor is programmed or configured to: generate a current image feature template based on the input image of the second user; compare the current image feature template to the predicted image feature template; determine that the current image feature template corresponds to the predicted image feature template; and perform an action based on determining whether to authenticate the identity of the second user.

In this way, embodiments of the present disclosure allow for the template authentication system to accurately authenticate an individual based on an image of a physical characteristic of the individual, such as a facial image of the individual, when aspects of the physical characteristic of the individual have changed due to aging. In addition, embodiments of the present disclosure do not require numerous samples of the physical characteristic of the individual to be obtained and stored and therefore reduces the requirements for technical resources (e.g., memory storage, processing resources, network resources, and/or the like).

Referring now to FIG. 1, FIG. 1 is a diagram of an example environment 100 in which devices, systems, methods, and/or products described herein may be implemented. As shown in FIG. 1, environment 100 includes template authentication system 102, template authentication database 102a, and user device 104. Template authentication system 102, template authentication database 102a, and user device 104 may interconnect (e.g., establish a connection to communicate, and/or the like) via wired connections, wireless connections, or a combination of wired and wireless connections.

Template authentication system 102 may include one or more computing devices configured to communicate with template authentication database 102a and/or user device 104 via communication network 106. For example, template authentication system 102 may include a group of servers and/or other like devices. In some non-limiting embodiments or aspects, template authentication system 102 may be associated with a transaction service provider, as described herein. Additionally or alternatively, template authentication system 102 may be associated with a merchant, a payment gateway, an acquirer institution, and/or an issuer system, as described herein.

Template authentication database 102a may include one or more computing devices configured to communicate with template authentication system 102 and/or user device 104 via communication network 106. For example, template authentication database 102a may include a server, a group of servers, and/or other like devices. In some non-limiting embodiments or aspects, template authentication database 102a may be associated with a transaction service provider, as described herein. Additionally or alternatively, template authentication database 102a may be associated with a merchant, a payment gateway, an acquirer institution, and/or an issuer system, as described herein.

User device 104 may include a computing device configured to communicate with template authentication system 102 and/or template authentication database 102a via communication network 106. For example, user device 104 may include a desktop computer, a portable computer (e.g., a laptop computer, a tablet computer, and/or the like), a mobile device (e.g., a cellular phone, a smartphone, a personal digital assistant, a wearable device, such as a smart watch, a pair of smart glasses, and/or the like) and/or like devices. In some non-limiting embodiments or aspects, user device 104 may include an image capture device, such as a camera. User device 104 may be configured to transmit data to and/or receive data from template authentication system 102 and/or template authentication database 102a via a short-range wireless communication connection (e.g., an NFC communication connection, an RFID communication connection, a Bluetooth® communication connection, and/or the like). In some non-limiting embodiments or aspects, user device 104 may be associated with a user (e.g., an individual operating a device). In some non-limiting embodiments or aspects, user device 104 may include or may be a component of a device that enables the user to perform a financial transaction with an account provided by a financial institution. For example, user device 104 may include or may be a component of an automated teller machine (ATM). In some non-limiting embodiments or aspects, user device 104 may include or may be a component of a POS device or a POS system. For example, user device 104 may include or may be a component of a POS device or a POS system of a self-checkout system (e.g., a cashier-less checkout system, a cashier-free checkout system, and/or the like). In some non-limiting embodiments or aspects, user device 104 may be a component of template authentication system 102.

Communication network 106 may include one or more wired and/or wireless networks. For example, communication network 106 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
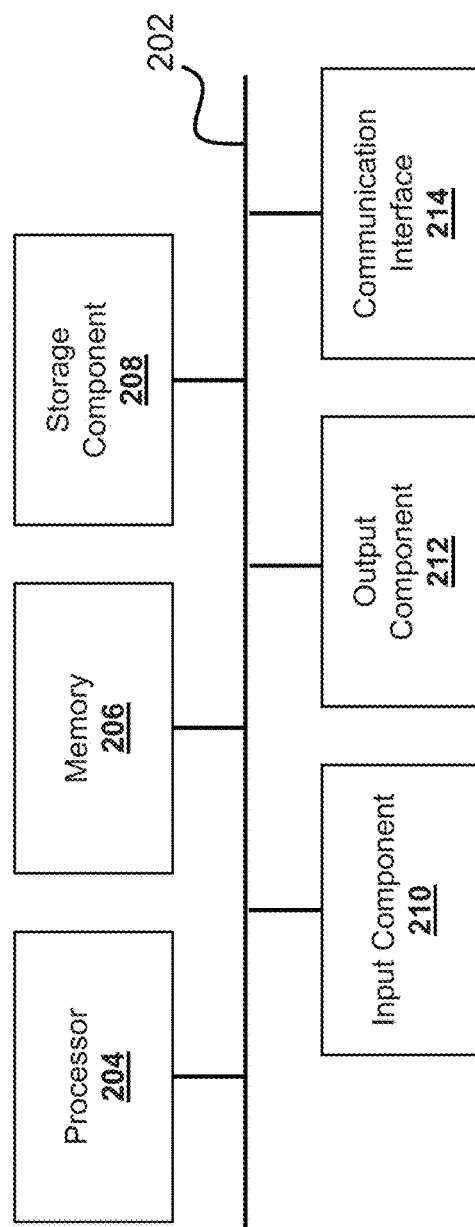
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to one or more devices of template authentication system 102, one or more devices of template authentication database 102a, one or more devices of user device 104, and/or one or more devices of communication network 106. In some non-limiting embodiments or aspects, one or more devices of template authentication system 102, one or more devices of template authentication database 102a, one or more devices of user device 104, and/or one or more devices of communication network 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, FIG. 3 is a flowchart of a non-limiting embodiment or aspect of a process 300 for authenticating an individual using image feature templates. In some non-limiting embodiments or aspects, one or more of the functions described with respect to process 300 may be performed (e.g., completely, partially, etc.) by template authentication system 102. In some non-limiting embodiments or aspects, one or more of the steps of process 300 may be performed (e.g., completely, partially, and/or the like) by another device or a group of devices separate from and/or including template authentication system 102, such as template authentication database 102a and/or user device 104.

As shown in FIG. 3, at step 302, process 300 may include generating a plurality of image feature templates. For example, template authentication system 102 may generate the plurality of image feature templates for the user associated with user device 104. In some non-limiting embodiments or aspects, the plurality of image feature templates for the user may be associated with a time interval. For example, template authentication system 102 may generate the plurality of image feature templates for the user associated with user device 104 during the time interval. In another example, template authentication system 102 may generate each image feature template of the plurality of image feature templates for the user based on one or more input images of the user received during the time interval. In some non-limiting embodiments or aspects, an image feature template may refer to a set of features that have been computed from an image in a similar way using a machine learning model. In some non-limiting embodiments or aspects, the image may be an image of a physical characteristic of the user. For example, the image may include a facial image, such as an image of at least a portion of a face of an individual that may be used for identification and/or authentication of the identity of the individual. In some non-limiting embodiments or aspects, the feature template may be an n-dimensional vector, where the dimensions of the vector include values that are representative of features of an image. In some non-limiting embodiments or aspects, template authentication system 102 may generate one or more feature templates by extracting the one or more feature templates from one or more layers (e.g., a layer or a plurality of layers) of a first machine learning model. In some non-limiting embodiments or aspects, template authentication system 102 may generate each image feature template of the plurality of image feature templates by extracting each image feature template from the first machine learning model. For example, template authentication system 102 may generate each image feature template of the plurality of image feature templates by extracting each image feature template from the first machine learning model after training the first machine learning model.

In some non-limiting embodiments or aspects, the first machine learning model may be a convolutional neural network (CNN) model (e.g., a machine learning model that includes a CNN architecture). In this way, having the first machine learning model be a CNN model may require less memory for running machine learning operations and allow for the training of a larger, more powerful network as compared to other machine learning networks models. In this way, template authentication system 102 may more quickly generate and/or generate a more effective machine learning network model with less resources as compared to another type of machine learning network model, such as a multilayer perceptron.

In some non-limiting embodiments or aspects, template authentication system 102 may generate each image feature template of the plurality of image feature templates for a point in time of the time interval. For example, template authentication system 102 may generate a first image feature template for a user with regard to a first point in time of the time interval, a second image feature template for a user with regard to a second point in time of the time interval, a third image feature template for a user with regard to a third point in time of the time interval, and additional image feature templates for a user with regard to additional points in time of the time interval as appropriate.

In some non-limiting embodiments or aspects, template authentication system 102 may generate each image feature template for each point in time of the time interval based on an input image of a user provided as an input to template authentication system 102 by user device 104 at the point in time (e.g., a facial image of a user provided as an input to template authentication system 102 by user device 104 at the point in time). For example, template authentication system 102 may generate the first image feature template with regard to the first point in time based on a first input image of a user (e.g., a first input image of a user received at the first point in time), the second image feature template with regard to the second point in time based on a second input image of the user (e.g., a second input image of the user received at the second point in time), and the third image feature template with regard to the third point in time based on a third input image of the user (e.g., a third input image of the user received at the third point in time). The first input image, the second input image, and the third input image may represent images of the user that were captured in a sequence. For example, the first point in time of the time interval may be a point in time of the time interval that is before the second point in time of the time interval and the second point in time of the time interval may be a point in time of the time interval that is before the third point in time of the time interval. With regard to each of the first input image, the second input image, and the third input image, each input image may be associated with a positive authentication of the identity of the user during the time interval. For example, each of the first input image, the second input image, and the third input image may have been determined to be an authentic image of the user by template authentication system 102 during the time interval. In some non-limiting embodiments or aspects, template authentication system 102 may generate each image feature template of the plurality of image feature templates at a respective point in time of the time interval or after the time interval.

In some non-limiting embodiments or aspects, template authentication system 102 may assign each image feature template for each point in time of the time interval with a time stamp for the respective point in time. For example, template authentication system 102 may assign the first image feature template with a first time stamp based on the first point in time, the second image feature template with a second time stamp based on the second point in time, and the third image feature template with a third time stamp based on the third point in time.

In some non-limiting embodiments or aspects, template authentication system 102 may generate the first machine learning model, where the first machine learning model is configured to authenticate an identity of a user (e.g., an individual) based on an image of the user. In one example, the first machine learning model may be configured to provide a prediction as to whether an image of the individual is an authentic image of the user (e.g., an image of the user that was determined to be authentic by template authentication system 102) and the prediction may be used to authenticate the identity of the user (e.g., by template authentication system 102 or another authentication system).

In some non-limiting embodiments or aspects, template authentication system 102 may train (e.g., initially train) the first machine learning model based on a training dataset that includes a plurality of images of a user (e.g., a plurality of facial images of a user). In some non-limiting embodiments or aspects, the training dataset may include a plurality of images of the user, where one or more images (e.g., all of the images, a set of the images, an image, and/or the like) of the plurality of images is an authentic image of the user. In some non-limiting embodiments or aspects, template authentication system 102 may train the first machine learning model training based on the training dataset that includes a plurality of images of one or more users, wherein the first machine learning model is configured to authenticate an identity of each of the one or more users based on an input image of each of the one or more users. In some non-limiting embodiments or aspects, template authentication system 102 may store the plurality of image feature templates and/or the training dataset in template authentication database 102a.

In some non-limiting embodiments or aspects, template authentication system 102 may train the first machine learning model based on a loss function. For example, template authentication system 102 may compute a result of a loss function based on training the first machine learning model using each image of the plurality of images of the user in the training dataset. Template authentication system 102 may back propagate the results of the loss function to update one or more weights of the first machine learning model.

In some non-limiting embodiments or aspects, template authentication system 102 may use the first machine learning model to authentic the identity of the user. For example, template authentication system 102 may receive an input image of the user from user device 104 (e.g., an input image of the user captured with an image capture device, such as a camera, of user device 104) and template authentication system 102 may provide the input image of the user as an input to the first machine learning model. Template authentication system 102 may receive an output from the first machine learning model that includes a prediction as to whether the image of the user is an authentic image of the user. Template authentication system 102 may determine to authentic the identity of the user based on the output of the first machine learning model, which indicates that a positive authentication of the identity of the user has been made.

In some non-limiting embodiments or aspects, template authentication system 102 may generate the plurality of image feature templates during the time interval using the first machine learning model. For example, template authentication system 102 may generate a first image feature template of the plurality of image feature templates with regard to a first point in time of the time interval using the first machine learning model, a second image feature template of the plurality of image feature templates with regard to a second point in time of the time interval using the first machine learning model, a third image feature template of the plurality of image feature templates with regard to a third point in time of the time interval using the first machine learning model, and additional image feature templates of the plurality of image feature templates with regard to additional points in time of the time interval using the first machine learning model as appropriate. In some non-limiting embodiments or aspects, each image feature template of the plurality of image feature templates may be associated with a positive authentication of the identity of the user during the time interval. In one example, template authentication system 102 may generate a first image feature template for the user after a first positive authentication of the identity of the user has been made (e.g., has been made during the time interval) using the first machine learning model, a second image feature template for the user after a second positive authentication of the identity of the user has been made using the first machine learning model, a third image feature template for the user after a third positive authentication of the identity of the user has been made using the first machine learning model, and additional image feature templates after additional positive authentications of the identity of the user has been made using the first machine learning model as appropriate.

In some non-limiting embodiments or aspects, template authentication system 102 may retrain the first machine learning model. For example, template authentication system 102 may retrain the first machine learning model after a positive authentication of the identity of the user. In such an example, template authentication system 102 may use the first machine learning model to determine whether to authentic the identity of the user based on an input image of the user. Template authentication system 102 may determine to authentic the identity of the user based on the input image of the user, which indicates that a positive authentication of the identity of the user has been made. Template authentication system 102 may add the input image of the user to the plurality of images in the training dataset (e.g., the training dataset from which the machine learning model was initially trained) to provide an updated training dataset. Template authentication system 102 may retrain the first machine learning model based on the updated training dataset (e.g., based on one or more images included in the updated training dataset). In some non-limiting embodiments or aspects, template authentication system 102 may store the updated training dataset in template authentication database 102a. In some non-limiting embodiments or aspects, template authentication system 102 may generate one or more image feature templates of the plurality of image feature templates by extracting the one or more image feature templates from the first machine learning model after retraining the first machine learning model. In some non-limiting embodiments or aspects, template authentication system 102 may combine all input images of the user that are associated with a positive authentication of the identity of the user after a time interval to provide a new training dataset. In some non-limiting embodiments or aspects, template authentication system 102 may retrain the first machine learning model based on one or more images included in the new training dataset. For example, template authentication system 102 may retrain the first machine learning model based on receiving one input image of the user that is associated with a positive authentication of the identity of the user. In another example, template authentication system 102 may retrain the first machine learning model based on receiving a set of input images (e.g., a batch of input images) of the user that are associated with positive authentications of the identity of the user.

In some non-limiting embodiments or aspects, template authentication system 102 may generate additional input images of the user. For example, template authentication system 102 may generate additional input images of the user using a generative adversarial network (GAN) model. In some non-limiting embodiments or aspects, template authentication system 102 may add the additional input images of the user to the plurality of images in a training dataset (e.g., a training dataset from which the machine learning was initially trained, an updated training dataset, a new training dataset, and/or the like).

As shown in FIG. 3, at step 304, process 300 may include generating a predicted image feature template for a user. For example, template authentication system 102 may generate one or more predicted image feature templates for a user associated with user device 104. In some non-limiting embodiments or aspects, the user associated with user device 104 (e.g., a first user) may be different than a user (e.g., a second user) associated with the plurality of images included in the training dataset that was used to train the first machine learning model. In some non-limiting embodiments or aspects, the user associated with user device 104 may be the same as the user associated with the plurality of images included in the training dataset that was used to train the first machine learning model.

In some non-limiting embodiments or aspects, the predicted image feature template for the user may include an image feature template that is based on a predicted image of the user with regard to a time (e.g., at a point in time or during a time interval) in the future. The predicted image of the user with regard to the time in the future may include a prediction of how the user will look at a point in time or during a time interval in the future. In some non-limiting embodiments or aspects, a predicted image feature template for the user may be associated with a predicted image of the user after a time interval (e.g., a historical time interval). For example, the predicted image feature for the user may be associated with a predicted image of the user after the time interval during which, there was one or more positive authentications of the identity of the user by template authentication system 102.

In some non-limiting embodiments or aspects, template authentication system 102 may generate a predicted image feature template for the user based on the plurality of image feature templates. For example, template authentication system 102 may extract the predicted image feature template from a second machine learning model after the second machine learning model was trained using the plurality of image feature templates. In some non-limiting embodiments or aspects, template authentication system 102 may generate a plurality of predicted image feature templates for the user based on the plurality of image feature templates. In some non-limiting embodiments or aspects, template authentication system 102 may assign each predicated image feature template of the plurality of predicted image feature templates for the user a time stamp based on a time in the future for which the respective predicated image feature template may be used to authenticate the identity of the user.

In some non-limiting embodiments or aspects, template authentication system 102 may generate the second machine learning model (e.g., a predicted image feature template generation machine learning model), where the second machine learning model is configured to generate a predicted image feature template of an individual (e.g., a user). For example, template authentication system 102 may generate the second machine learning model based on the plurality of image feature templates.

In some non-limiting embodiments or aspects, the second machine learning model may be a long short-term memory (LSTM) model (e.g., a machine learning model that includes an LSTM recurrent neural network architecture). In this way, a LSTM model may store historical information in memory during machine learning operations and allow for more accurate production of predicted image feature templates as compared to other machine learning network models. In this way, template authentication system 102 may more accurately generate the predicted image feature template for a user with less resources as compared to other types of machine learning network models, such as a multilayer perceptron or convolution neural network.

In some non-limiting embodiments or aspects, template authentication system 102 may generate one or more predicted image feature templates using the second machine learning model. For example, template authentication system 102 may generate one or more predicted image feature templates by extracting the one or more predicted image feature templates from one or more layers (e.g., a layer or a plurality of layers) of the second machine learning model.

In some non-limiting embodiments or aspects, template authentication system 102 may train (e.g., initially train) the second machine learning model based on a training dataset that includes a plurality of image feature templates. In some non-limiting embodiments or aspects, the training dataset may include a plurality of image feature templates, where one or more of the image feature templates (e.g., all of the image feature templates, a set of the image feature templates, an image feature template, and/or the like) of the plurality of images is associated with a positive authentication of the identity of the user. In some non-limiting embodiments or aspects, template authentication system 102 may store a predicted image feature template and/or the training dataset in template authentication database 102*a*.

As shown in FIG. 3, at step 306, process 300 may include determining whether to authenticate the user based on an input image of the user. For example, template authentication system 102 may determine whether to authenticate the identity of the user associated with user device 104 during a run-time (e.g., a real-time) process based on an input image of the user and the predicted image feature template for the user. In some non-limiting embodiments or aspects, template authentication system 102 may generate a current image feature template (e.g., an image feature template generated during the run-time process) for the user based on the input image of the user, compare the current image feature template for the user to the predicted image feature template for the user, and determine whether the current image feature template for the user corresponds to the predicted image feature template for the user. If template authentication system 102 determines that the current image feature template for the user corresponds to the predicted image feature template for the user, template authentication system 102 may determine to authenticate the user. If template authentication system 102 determines that the current image feature template for the user does not correspond to the predicted image feature template for the user, template authentication system 102 may determine not to authenticate the user. In some non-limiting embodiments or aspects, template authentication system 102 may generate the current image feature template for the user using the first machine learning model. For example, template authentication system 102 may generate the current image feature template by extracting the current image feature template from one or more layers (e.g., a layer or a plurality of layers) of the first machine learning model. For example, template authentication system 102 may generate the current image feature template by extracting the current image feature template from the first machine learning model after providing the input image of the user as an input to the first machine learning model and/or after training the first machine learning model.

In some non-limiting embodiments or aspects, template authentication system 102 may determine whether the current image feature template for the user corresponds to a predicted image feature template for the user based on a time associated with the run-time process. For example, template authentication system 102 may determine a time associated with the run-time process (e.g., a point in time at which the run-time process is occurring or a time interval during which the run-time process is occurring). Template authentication system 102 may retrieve the predicted image feature template for the user from a plurality of predicted image feature templates for the user stored in template authentication database 102a based on the time associated with the run-time process. In some non-limiting embodiments or aspects, template authentication system 102 may retrieve the predicted image feature template for the user using the time associated with the run-time process. For example, template authentication system 102 may select a predicted image feature template for the user that is assigned a time stamp that corresponds to the time associated with the run-time process from the plurality of predicted image feature templates for the user. Template authentication system 102 may retrieve the predicted image feature template for the user and template authentication system 102 may compare the current image feature template for the user to the predicted image feature template for the user. Template authentication system 102 may determine whether the current image feature template for the user corresponds to the predicted image feature template for the user based on comparing the current image feature template for the user to the predicted image feature template for the user.

In some non-limiting embodiments or aspects, template authentication system 102 may determine whether the current image feature template for the user corresponds to the predicted image feature template for the user based on a distance. For example, template authentication system 102 may determine a distance (e.g., a Euclidean distance) between one or more values of the current image feature template for the user and one or more values of the predicted image feature template for the user. Template authentication system 102 may determine whether the distance satisfies a threshold by comparing the distance to the threshold. If template authentication system 102 determines that the distance satisfies the threshold, template authentication system 102 may determine that the current image feature template for the user corresponds to the predicted image feature template for the user. If template authentication system 102 determines that the distance does not satisfy the threshold, template authentication system 102 may determine that the current image feature template for the user does not correspond to the predicted image feature template for the user.

As shown in FIG. 3, at step 308, process 300 may include performing an action based on determining whether to authenticate the user. For example, template authentication system 102 may perform the action based on determining whether to authenticate the identity of the user associated with user device 104. In some non-limiting embodiments or aspects, template authentication system 102 may perform an action associated with allowing or preventing access (e.g., access to an account of the user, access to a computer system, and/or the like) based on determining whether to authenticate the identity of the user associated with user device 104. For example, template authentication system 102 may perform an action associated with allowing access based on determining to authenticate the identity of the user associated with user device 104. In another example, template authentication system 102 may perform an action associated with preventing access based on determining not to authenticate the identity of the user associated with user device 104.

In some non-limiting embodiments or aspects, template authentication system 102 may perform an action associated with authorizing an operation (e.g., an operation associated with a run-time process, such as a payment transaction, an operation of a computer system carrying out a run-time command, and/or the like) which is to be carried out based on determining whether to authenticate the identity of the user associated with user device 104. For example, template authentication system 102 may perform an action associated with authorizing the operation to be carried out based on determining to authenticate the identity of the user associated with user device 104. In another example, template authentication system 102 may perform an action associated with not authorizing the operation to be carried out based on determining not to authenticate the identity of the user associated with user device 104.

In some non-limiting embodiments or aspects, template authentication system 102 may transmit a message regarding an authentication process. For example, template authentication system 102 may transmit a message to user device 104 that includes an indication that the identity of the user has been authenticated based on template authentication system 102 determining to authenticate the identity of the user. In another example, template authentication system 102 may transmit a message to user device 104 that includes an indication that the identity of the user has not been authenticated based on template authentication system 102 determining not to authenticate the identity of the user.

In some non-limiting embodiments or aspects, template authentication system 102 may transmit a message that includes a request for the user associated with user device 104 to provide additional authentication parameters based on template authentication system 102 determining not to authenticate the identity of the user. For example, template authentication system 102 may transmit a message that includes a request for the user to provide a gesture, such as a motion associated with waving hands for confirmation, via user device 104 (e.g., via an image capture device of user device 104).

Referring now to FIGS. 4A-4H, FIGS. 4A-4H are diagrams of an implementation 400 of a process (e.g., process 300) for authenticating an individual using image feature templates. As shown by reference number 405 in FIG. 4A, template authentication system 102 may initially train a first machine learning model (e.g., a feature template authentication machine learning model). In some non-limiting embodiments or aspects, template authentication system 102 may initially train the first machine learning model based on a training dataset that includes a plurality of facial images of a user. In some non-limiting embodiments or aspects, the training dataset may include a plurality of facial images of the user, where each facial image of the plurality of facial images is an authentic facial image of the user. In some non-limiting embodiments or aspects, the first machine learning model is configured to authenticate an identity of the user based on an input facial image of the user (e.g., an input provided to template authentication system 102 by user device 104 that includes a facial image of the user). In some non-limiting embodiments or aspects, the first machine learning model may be a convolutional neural network (CNN) model (e.g., a machine learning model that includes a CNN architecture).

Figure 4A:
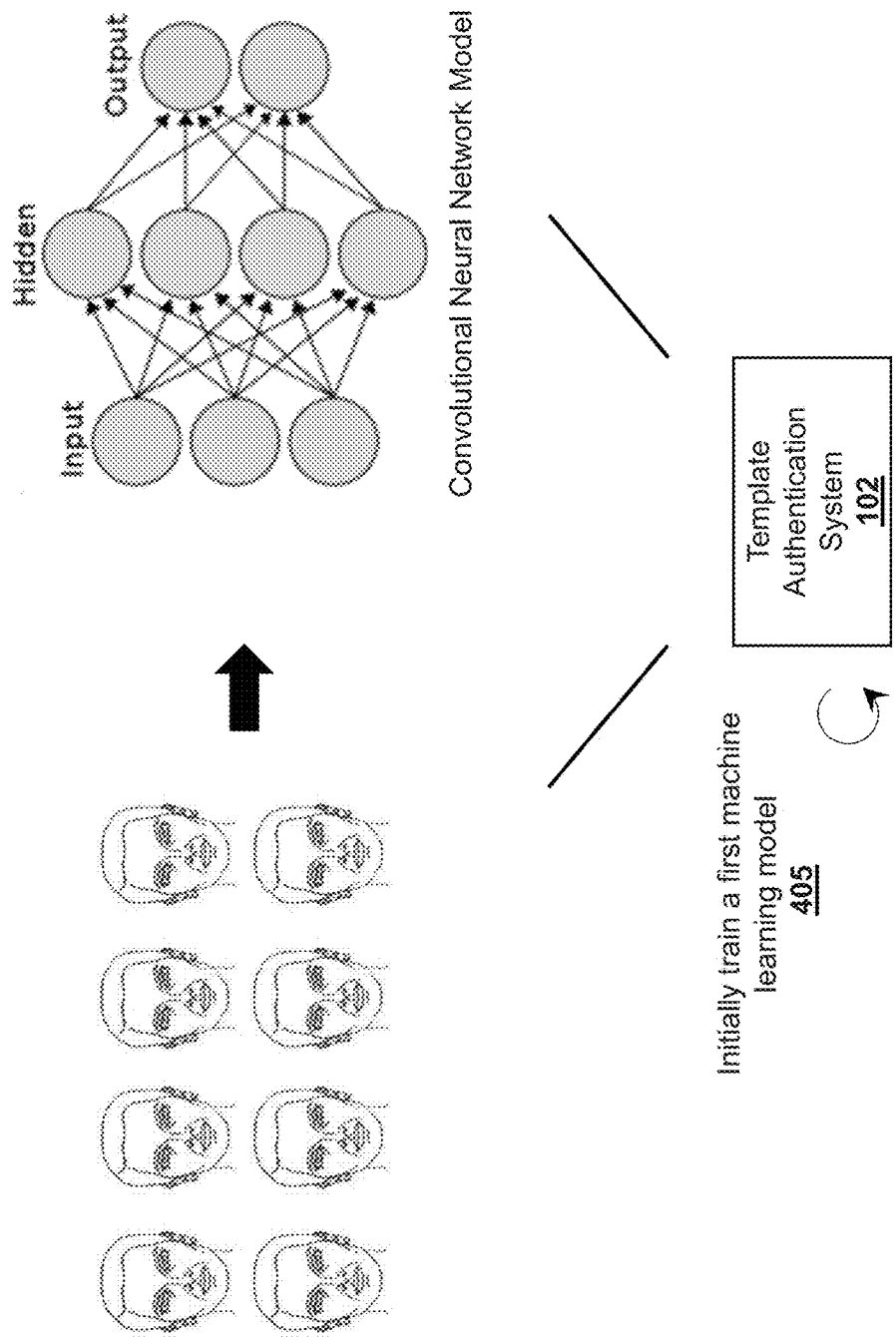
Figure 4B:
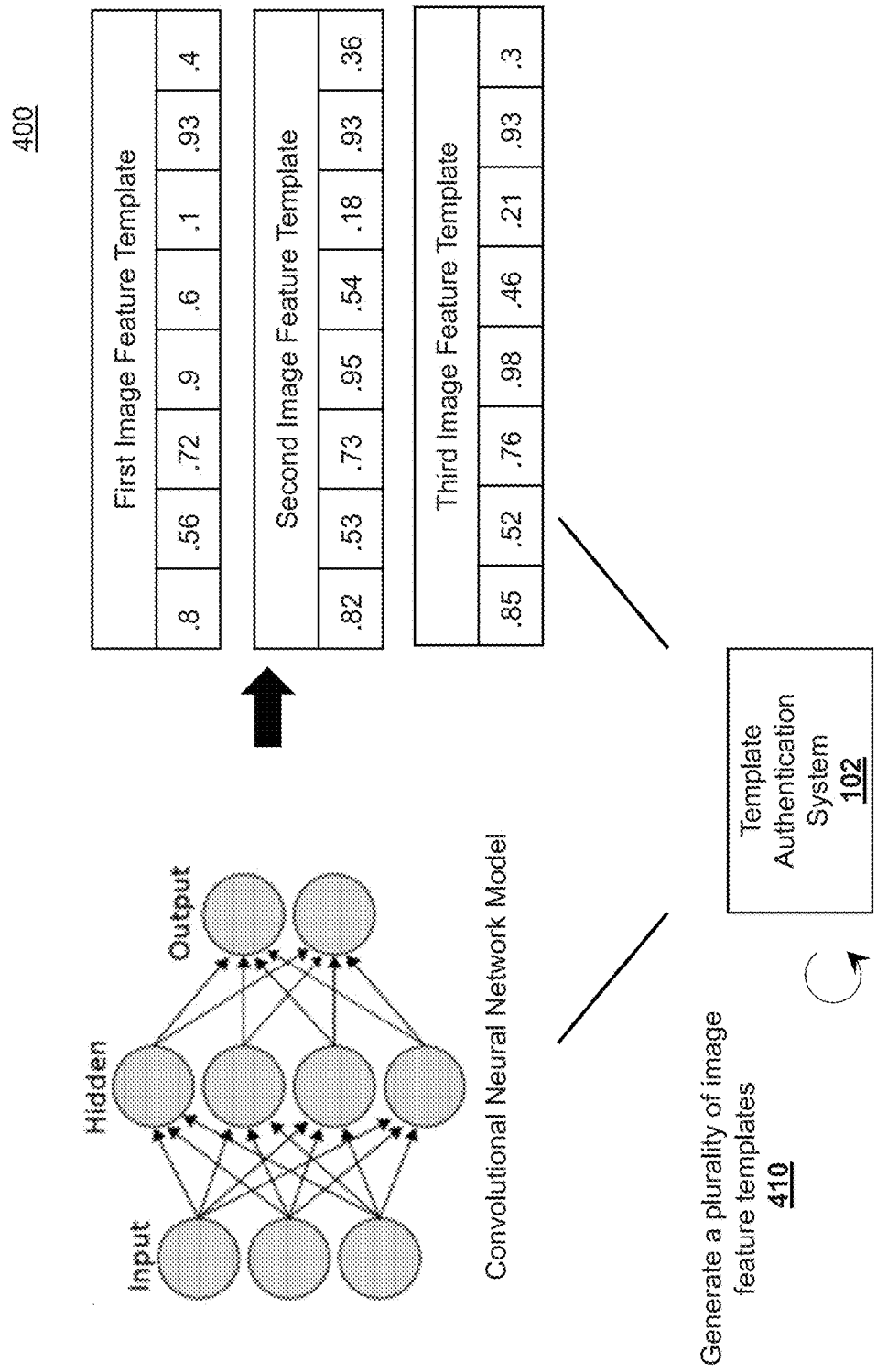

As shown by reference number 410 in FIG. 4B, template authentication system 102 may generate a plurality of image feature templates for the user associated with user device 104 using the first machine learning model. In some non-limiting embodiments or aspects, template authentication system 102 may generate the plurality of image feature templates during the time interval using the first machine learning model. For example, template authentication system 102 may generate a first image feature template of the plurality of image feature templates with regard to a first point in time of the time interval using the first machine learning model, a second image feature template of the plurality of image feature templates with regard to a second point in time of the time interval using the first machine learning model, and a third image feature template of the plurality of image feature templates with regard to a third point in time of the time interval using the first machine learning model. In some non-limiting embodiments or aspects, the time interval may be a time interval during which a predetermined number of positive authentications of the identity of the user have been made.

As shown by reference number 415 in FIG. 4C, template authentication system 102 may generate a second machine learning model (e.g., a predicted image feature template generation machine learning model) based on the plurality of image feature templates for the user associated with user device 104. In some non-limiting embodiments or aspects, the second machine learning model is configured to generate a predicted image feature template of the user associated with user device 104. In some non-limiting embodiments or aspects, template authentication system 102 may initially train the second machine learning model based on a training dataset that includes the plurality of image feature templates.

Figure 4D:
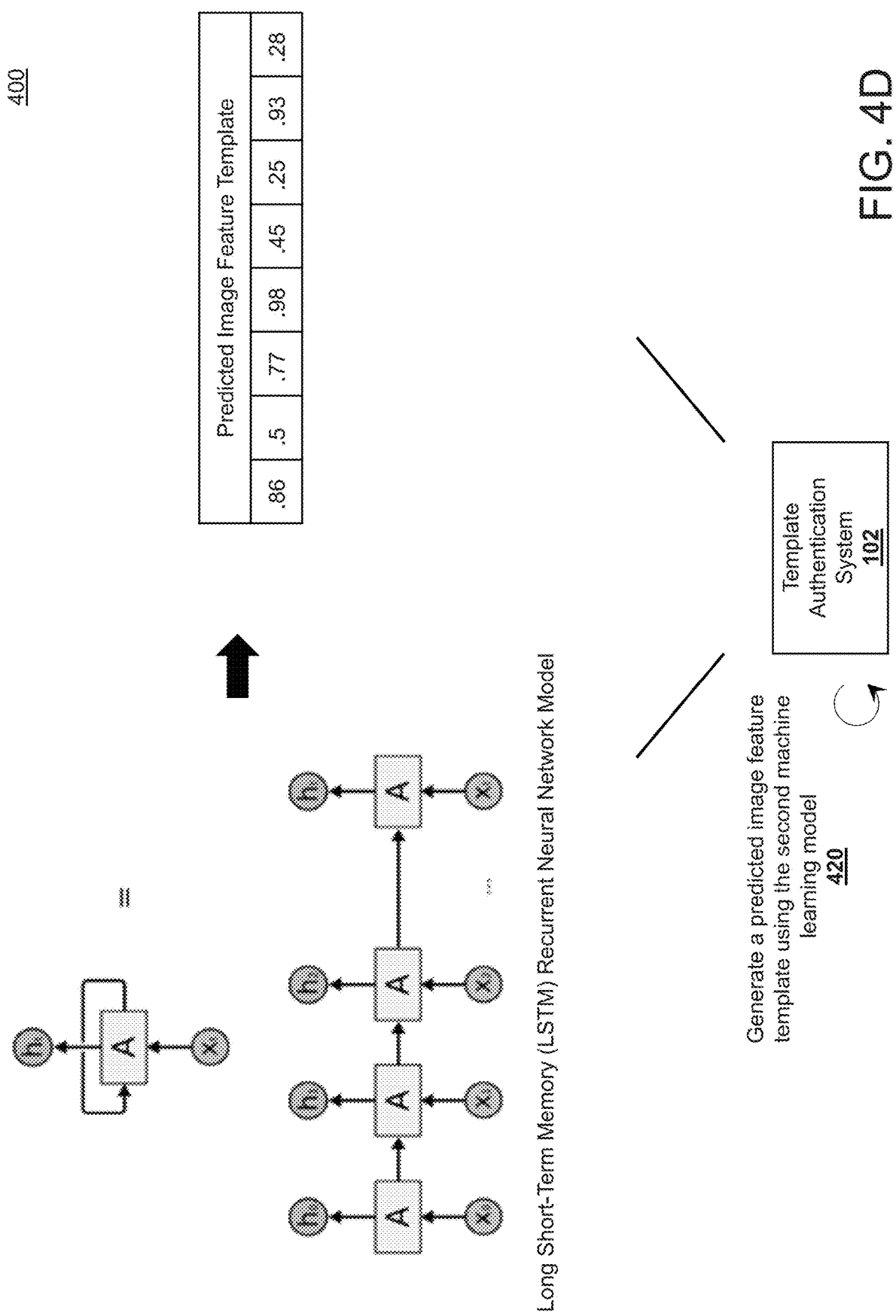

As shown by reference number 420 in FIG. 4D, template authentication system 102 may generate a predicted image feature template for the user associated with user device 104 using the second machine learning model. In some non-limiting embodiments or aspects, template authentication system 102 may generate the predicted image feature template by extracting the predicted image feature template from one or more layers (e.g., a layer or a plurality of layers) of the second machine learning model.

Figure 4E:
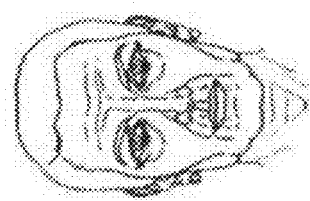

As shown by reference number 425 in FIG. 4E, template authentication system 102 may receive an input facial image from user device 104. In some non-limiting embodiments or aspects, template authentication system 102 may receive the input facial image from user device 104 during a run-time (e.g., a real-time) process that occurs after the time interval during which the plurality of image feature templates were generated. For example, template authentication system 102 may receive the input facial image from user device 104 during a checkout process involving a self-checkout system (e.g., a self-checkout system of which user device 104 is a component) at a merchant location (e.g., a store of a merchant).

Figure 4G:
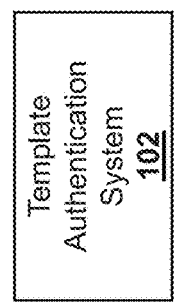

As shown in FIGS. 4F and 4G, template authentication system 102 may determine whether to authenticate the identity of the user associated with user device 104 based on the input facial image of the user. As shown by reference number 430 in FIG. 4F, template authentication system 102 may generate a current image feature template for the user based on the input facial image of the user. In some non-limiting embodiments or aspects, template authentication system 102 may generate the current image feature template by extracting the current image feature template from one or more layers (e.g., a layer or a plurality of layers) of the first machine learning model after providing the input facial image as an input to the first machine learning model. As shown by reference number 435 in FIG. 4G, template authentication system 102 may compare the current image feature template for the user to the predicted image feature template for the user. As further shown by reference number 440 in FIG. 4G, template authentication system 102 may determine whether the current image feature template for the user corresponds to the predicted image feature template for the user. In some non-limiting embodiments or aspects, template authentication system 102 may determine to authenticate the identity of the user associated with user device 104 based on determining that the current image feature template for the user corresponds to the predicted image feature template for the user. In some non-limiting embodiments or aspects, template authentication system 102 may determine not to authenticate the identity of the user associated with user device 104 based on determining that the current image feature template for the user does not correspond to the predicted image feature template for the user.

Figure 4H:
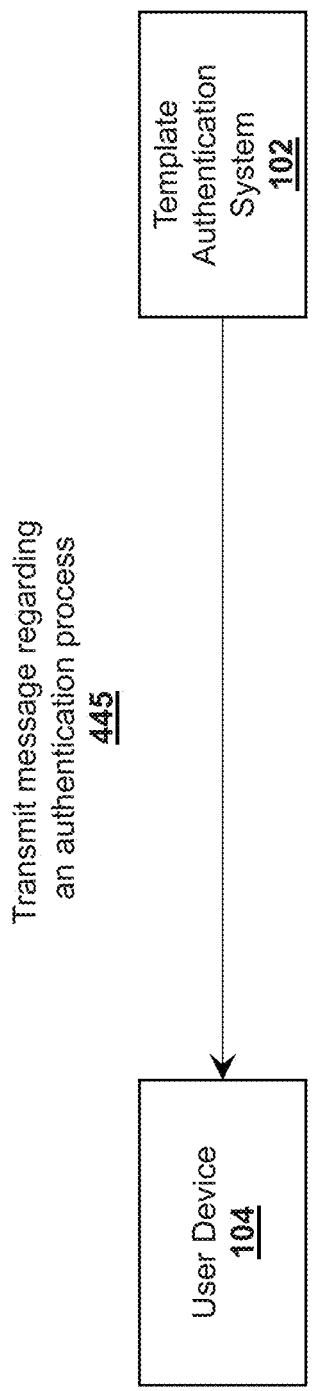

As shown in FIG. 4H, template authentication system 102 may perform an action based on determining whether to authenticate the identity of the user associated with user device 104. As shown by reference number 445 in FIG. 4H, template authentication system 102 may transmit a message regarding an authentication process to user device 104. For example, template authentication system 102 may transmit a message that includes an indication that the identity of the user has been authenticated based on template authentication system 102 determining to authenticate the identity of the user. In another example, template authentication system 102 may transmit a message that includes an indication that the identity of the user has not been authenticated based on template authentication system 102 determining not to authenticate the identity of the user.

In some non-limiting embodiments or aspects, template authentication system 102 may transmit a message that includes a request for the user associated with user device 104 to provide additional authentication parameters based on template authentication system 102 determining not to authenticate the identity of the user. For example, template authentication system 102 may transmit a message that includes a request for the user to provide a gesture, such as a motion associated with waving hands for confirmation, via user device 104 (e.g., via an image capture device of user device 104).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:
1. A system, comprising:
  at least one processor programmed or configured to:
    train a first machine learning model based on a training dataset of a plurality of images of one or more first users, wherein the first machine learning model is configured to authenticate an identity of the one or more first users based on an input image of the one or more first users;
generate a plurality of image feature templates using the first machine learning model, wherein each image feature template of the plurality of image feature templates is associated with a positive authentication of the identity of the one or more first users during a time interval, wherein each image feature template is a multi-dimensional vector, where the dimensions of the vector include values that are representative of features of an image, and wherein, when generating the plurality of image feature templates, the at least one processor is programmed or configured to:
generate each image feature template of the plurality of image feature templates for the one or more first users for a point in time of the time interval based on one or more input images of the one or more first users received during the time interval that resulted in a positive authentication of the identity of the one or more first users during the time interval;
generate a second machine learning model based on the plurality of image feature templates;
generate a predicted image feature template using the second machine learning model, wherein the predicted image feature template comprises an image feature template that is based on a predicted image of a second user with regard to a future time after the time interval;
determine to authenticate the identity of the second user based on an input image of the second user received after the time interval, wherein, when determining to authenticate the identity of the second user based on the input image of the second user, the at least one processor is programmed or configured to:
generate a current image feature template based on the input image of the second user,
compare the current image feature template to the predicted image feature template, and
determine that the current image feature template corresponds to the predicted image feature template; and
perform an action based on determining to authenticate the identity of the second user.

2. The system of claim 1, wherein, when training the first machine learning model based on the training dataset of the plurality of images of the one or more first users, the at least one processor is programmed or configured to:
train the first machine learning model based on a training dataset of a plurality of facial images of the one or more first users.

3. The system of claim 1, wherein, when generating the plurality of image feature templates using the first machine learning model, the at least one processor is programmed or configured to:
extract a first image feature template from the first machine learning model after training the first machine learning model.

4. The system of claim 1, wherein the at least one processor is programmed or configured to:
add the input image of the second user to the plurality of images of the one or more first users in the training dataset to provide an updated training dataset; and
retrain the first machine learning model based on the updated training dataset.

5. The system of claim 4, wherein, when generating the plurality of image feature templates using the first machine learning model, the at least one processor is programmed or configured to:
extract a first image feature template from the first machine learning model after retraining the first machine learning model based on the updated training dataset.

6. The system of claim 1, wherein the first machine learning model is a convolutional neural network model and the second machine learning model is a long short-term memory recurrent neural network model.

7. A method, comprising:
training, with at least one processor, a first machine learning model based on a training dataset of a plurality of images of one or more first users, wherein the first machine learning model is configured to authenticate an identity of the one or more first users based on an input image of the one or more first users;
generating, with at least one processor, a plurality of image feature templates using the first machine learning model, wherein each image feature template of the plurality of image feature templates is associated with a positive authentication of the identity of the one or more first users during a time interval, wherein each image feature template is a multi-dimensional vector, where the dimensions of the vector include values that are representative of features of an image, and wherein generating the plurality of image feature templates comprises:
generating each image feature template of the plurality of image feature templates for the one or more first users for a point in time of the time interval based on one or more input images of the one or more first users received during the time interval that resulted in a positive authentication of the identity of the one or more first users during the time interval;
generating, with at least one processor, a second machine learning model based on the plurality of image feature templates;
generating, with at least one processor, a predicted image feature template using the second machine learning model, wherein the predicted image feature template comprises an image feature template that is based on a predicted image of a second user with regard to a future time after the time interval;
determining, with at least one processor, whether to authenticate the identity of the second user based on an input image of the second user received after the time interval, wherein determining whether to authenticate the identity of the second user based on the input image of the second user comprises:
generating a current image feature template based on the input image of the second user;
comparing the current image feature template to the predicted image feature template; and
determining whether the current image feature template corresponds to the predicted image feature template; and
performing an action based on determining whether to authenticate the identity of the second user.

8. The method of claim 7, wherein training the first machine learning model based on the training dataset of the plurality of images of the one or more first users comprises:

training the first machine learning model based on a training dataset of a plurality of facial images of the one or more first users.

9. The method of claim 7, wherein generating the plurality of image feature templates using the first machine learning model comprises:
extracting a first image feature template from the first machine learning model after training the first machine learning model.

10. The method of claim 7, further comprising:
adding the input image of the second user to the plurality of images of the one or more first users in the training dataset to provide an updated training dataset; and
retraining the first machine learning model based on the updated training dataset.

11. The method of claim 10, wherein generating the plurality of image feature templates using the first machine learning model comprises:
extracting a first image feature template from the first machine learning model after retraining the first machine learning model.

12. The method of claim 7, wherein the first machine learning model is a convolutional neural network model and the second machine learning model is a long short-term memory recurrent neural network model.

13. A computer program product, the computer program product comprising at least one non-transitory computer-readable medium including one or more instructions that, when executed by at least one processor, cause the at least one processor to:
train a first machine learning model based on a training dataset of a plurality of images of one or more first users, wherein the first machine learning model is configured to authenticate an identity of the one or more first users based on an input image of the one or more first users;
generate a plurality of image feature templates using the first machine learning model, wherein each image feature template of the plurality of image feature templates is associated with a positive authentication of the identity of the one or more first users during a time interval, wherein each image feature template is a multi-dimensional vector, where the dimensions of the vector include values that are representative of features of an image, and wherein, the one or more instructions that cause the at least one processor to generate the plurality of image feature templates, cause the at least one processor to:
generate each image feature template of the plurality of image feature templates for the one or more first users for a point in time of the time interval based on one or more input images of the user received during the time interval that resulted in a positive authentication of the identity of the one or more first users during the time interval;

generate a second machine learning model based on the plurality of image feature templates;
generate a predicted image feature template using the second machine learning model, wherein the predicted image feature template comprises an image feature template that is based on a predicted image of a second user with regard to a future time after the time interval;
determine to authenticate the identity of the second user based on an input image of the second user received after the time interval, wherein, the one or more instructions that cause the at least one processor to determine to authenticate the identity of the second user based on the input image of the second user, cause the at least one processor to:
generate a current image feature template based on the input image of the second user,
compare the current image feature template to the predicted image feature template, and
determine that the current image feature template corresponds to the predicted image feature template; and
perform an action based on determining whether to authenticate the identity of the second user.

14. The computer program product of claim 13, wherein, the one or more instructions that cause the at least one processor to train the first machine learning model, cause the at least one processor to:
train the first machine learning model based on a training dataset of a plurality of facial images of the one or more first users.

15. The computer program product of claim 13, wherein, the one or more instructions that cause the at least one processor to generate the plurality of image feature templates using the first machine learning model, cause the at least one processor to:
extract a first image feature template from the first machine learning model after training the first machine learning model.

16. The computer program product of claim 13, wherein the one or more instructions further cause the at least one processor to:
add the input image of the second user to the plurality of images of the one or more first users in the training dataset to provide an updated training dataset; and
retrain the first machine learning model based on the updated training dataset.

17. The computer program product of claim 16, wherein, the one or more instructions that cause the at least one processor to generate the plurality of image feature templates using the first machine learning model, cause the at least one processor to:
extract a first image feature template from the first machine learning model after retraining the first machine learning model based on the updated training dataset.

* * * * *